July 21, 1964  B. B. YOUNG  3,141,948
ELECTRICAL TEMPERATURE CONTROL APPARATUS
Filed April 18, 1962
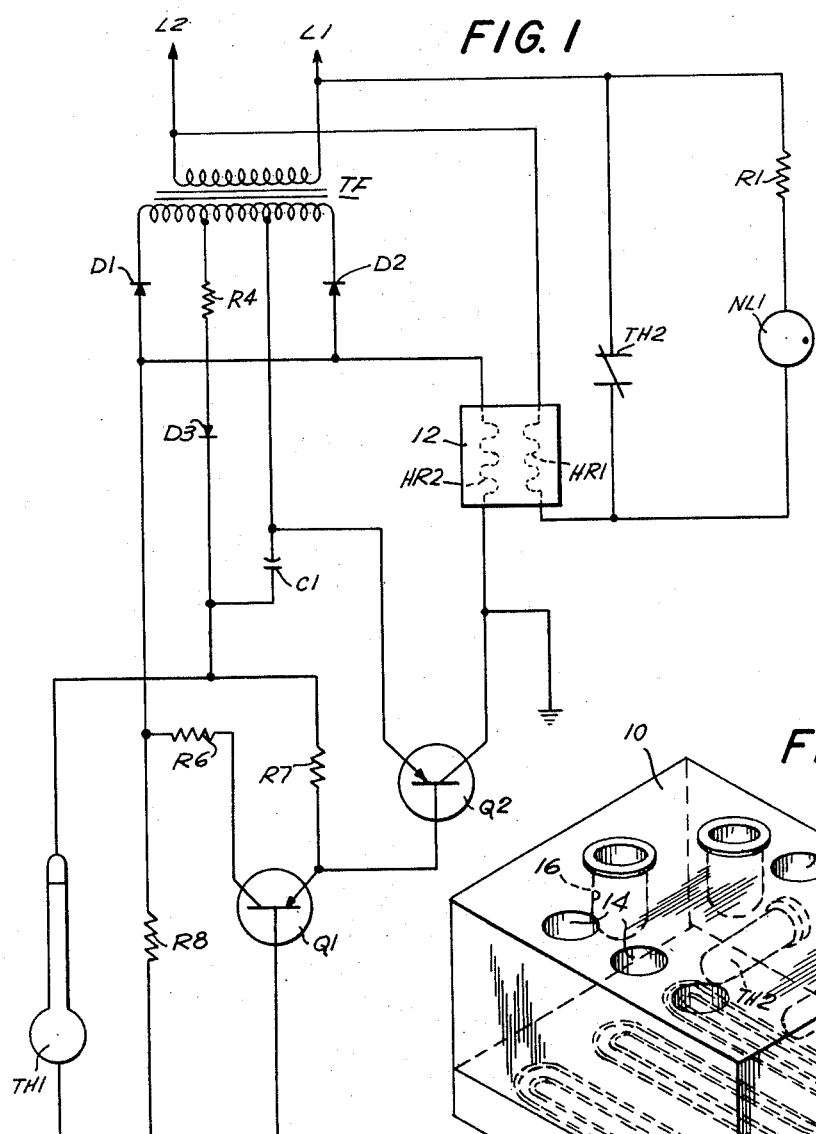
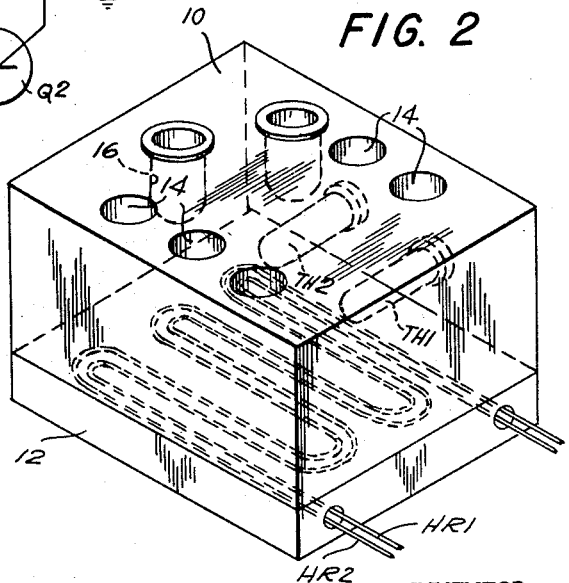
INVENTOR.
BRUCE B. YOUNG
BY
Kane, Dalsimer and Kane
ATTORNEYS

United States Patent Office 3,141,948
Patented July 21, 1964

3,141,948
ELECTRICAL TEMPERATURE CONTROL
APPARATUS
Bruce B. Young, 303 W. Matsonford Road, Radnor, Pa.
Filed Apr. 18, 1962, Ser. No. 188,484
13 Claims. (Cl. 219—494)

This invention relates to temperature control apparatus and in particular to a bi-partite thermostat system for quickly heating up a given body and thereafter maintaining that temperature within a very small range.

There are a number of applications in which it is desired to heat a given body up to operating temperature within a short time and thereafter to maintain that temperature within narrow limits. For example, in measuring coagulation properties of blood plasma in diagnostic and therapy control, temperatures at which such tests and procedures are conducted are an important factor in assuring accurate results. In accordance with a particular technique, standardized and stabilized chemical reagents are placed in tubes and heated to normal body temperatures, notably 37° C., the accepted standard. The quantity of reagent is ordinarily fixed for proper time determinations. Control plasma at the standard operating temperature and of predetermined quantity, also in tubes, is then dispensed in one of the tubes containing reagent. A probe, either manually or automatically operated is then inserted and withdrawn from the reaction mixture for purposes of sensing the initial clot formation. This operation is also conducted at the standard operating temperature. The same procedure is followed utilizing a controlled amount of patient's plasma. The prothrombin times are read and recorded.

In these prothrombin and coagulation time determinations and studies, the rate of clotting reaction is dependent upon temperature. If the operating temperature is not maintained within permissible narrow limits throughout, inaccurate and erroneous results are inevitable. Under such circumstances, this unfortunately may be reflected in improper therapy administration. Therefore, fluctuations in temperature should be reduced to a minimum. Relatively quick heating times naturally would permit the plasma samples to be tested at the stated temperature without undue delay, thereby increasing efficiency and permitting ready use in case of emergencies.

Attempts heretofore at heating units of the class described have been unsatisfactory. Such units were either insensitive to the point that unacceptable "undershooting" and "overshooting" of the desired temperature were prevalent; or other units required relatively long times to raise the temperature to the desired operating point.

It is therefore an object of the present invention to provide temperature control apparatus for quickly heating up a given body and thereafter maintaining the temperature of that body within predetermined limits.

Another object of the invention is to provide a temperature control system for a given body which after the operating temperature has been initially attained, uses a thermostat-heater combination that requires low-current drain.

Another object of the invention is to provide such apparatus and system with a continuous visual indication that the body has been raised to the operating temperature.

Still other objects of the invention will occur to those skilled in the art from a perusal of the specification, claims and drawing herein.

In order to obtain a short warm-up time and to stabilize the temperature within a narrow range, I have devised a system which includes a first thermostat with an associated first heating element which is large enough to heat up the desired body to the right temperature within a short time. In addition, I provide that once the operating temperature has been initially reached, the first thermostat opens and the first heating element is rendered substantially ineffective while a second "fine" heating element with an associated second thermostat takes over the job of maintaining the temperature of the body constant within the desired limits. The second heating element-thermostat combination is constructed to have a low power requirement. The power, as well as current requirement, are preferably low so that at average ambient temperatures and heating loads the "fine" thermostat cycles with approximately 50 percent off and 50 percent on time. With this in mind, the body temperature can be expected to be maintained over the expected range of ambient temperatures and heating loads.

FIG. 1 is a diagrammatic view of the electrical circuitry embodied by my invention, and FIG. 2 is a schematic view of a contemplated heating block having application in prothrombin time determinations shown associated with the heaters and thermostats of this circuit.

Referring to FIG. 1, it should be understood that the heating elements and the thermostats shown therein are so placed with respect to the given body that they respectively directly influence and are influenced by the temperature of that body. In this figure there is shown a "warm-up" circuit comprising the resistance element HR1, the bimetallic thermostat TH2 having a suitably large differential between its turn-off and turn-on temperatures, the neon light NL1, the resistor R1, the primary winding of the transformer TF, and the input terminals L1 and L2 of a 115 volt source. When the voltage from the voltage source is supplied to the warm-up circuit by means of the activation of an appropriate switch (not shown), current will flow through the resistance element HR1 and the closed contacts of the bimetallic thermostat TH2 which is in shunt with the series combination of the resistor R1 and the neon light NL1. Since the thermostat TH2 is effectively a short-circuit across the neon light, the latter will be off when the switch is first turned on. When the resistance element HR1 heats up the body to the desired temperature, the thermostat TH2 opens so that the current from the voltage source now flows through R1 and NL1 turning on the latter. Current also flows through element HR1, but since the resistance value of resistor R1 is relatively high and since as much as 70 volts are required to activate the neon light, the small amount of current passing through HR1 does not produce much in the way of heat. At the same time, during the warm-up period, the second circuit described below is also assisting in warming-up the body since it, too, is energized. After the warm-up period, the contacts of thermostat TH2 remain open, since the temperature maintenance circuit described below holds the body at a temperature higher than the temperature at which the contacts of TH2 will reclose. The neon light NL1 stays on and thereby provides a visual signal that the body has arrived at the desired temperature.

There is also a temperature maintenance circuit connected to the secondary winding of transformer TF. This includes rectifiers D1 and D2, which produce negative D.C. voltages at their terminals which are unconnected to TF, and rectifier D3 which is connected to TF through resistor R4 and produces a positive voltage. It also includes a "fine" or "vernier" thermostat TH1 which may be mercury type, for example. One terminal of TH1 is connected to the rectifier D3 and the other terminal is connected to the base of one of the two transistors Q1 and Q2. There is also a "fine" heating element HR2 in series with the parallel combination of D1 and D2, and the collector and emitter of transistor Q2. The emitter of Q2 is also connected by a return lead to the secondary of the transformer TF and to one side of a filter capacitor C1. Current from the secondary winding of the transformer TF will flow through the collector-emitter circuit of Q2 whenever the potential applied to the base of latter is negative with respect to its emitter. There is also a transistor Q1 whose emitter is connected directly to the base of Q2, to the rectifier D3 and to the other side of capacitor C1. The collector of Q1 is connected via a voltage-dropping resistor R6 to rectifier D1 and via another resistor R8 to the thermostat TH1.

When the temperature of the body exceeds the predetermined temperature, the mercury rises in the thermostat TH1 thereby connecting the base of Q1 to the positive D.C. potential at the rectifier D3. Since Q1 is a P-N-P transistor it is turned off so that its collector-emitter circuit is opened and thereby the base of Q2 is connected only to the positive D.C. potential at one terminal of D3 causing Q2 also to turn off. Since heater element HR2 is in series with the opened collector-emitter circuit of Q2, no current can then pass through it. There is of course a very small current flowing through the heating element HR2, due to back leakage of Q2. However, for all intents and purposes this current can be neglected.

When the temperature of the body decreases, the mercury in TH1 falls, opening its circuit and removing the positive potential previously applied to its base. Q1 thereupon is turned on again so the negative potential at one terminal of D1 can be applied through R6 and the collector-emitter circuit of Q1 to the base of Q2 which thereupon is turned on and current once again flows through the "fine" heating element HR2. Only the current flowing through R8, plus that flowing through the base of Q1 flows through TH1. This is a small fraction of the current drawn by the heater HR2, and the effective life of TH1 is very long.

In FIG. 2 I have shown the manner in which my circuit may be applied to prothrombin time determinations. In this connection, a heating block 10 is shown associated with heaters HR1 and HR2, both of which may be placed in suitable lamination 12. Thermostats TH1 and TH2 are also associated with the block 10 as shown. The upper face of the block may be formed with wells 14 for receiving tubes, containing either blood plasma, whether it be a control or that of a patient or, on the other hand, the selected chemical reagent. A reaction well 16 may also be formed in the block 10 to receive the tube containing the reaction mixture of plasma and reagent at which time the initial clot formation may be sensed or detected. My invention when employed under such conditions and for such applications will heat the block 10 up to operating temperature within a short period of time and thereafter maintain this temperature within narrow limits. The accepted standard operating temperature under these circumstances is that of normal body temperature, which is taken to be 37° C.

In one illustrative embodiment, applicable to prothrombin time determinations, the following values for the various components of the circuit were found satisfactory:

R1—82 KΩ
R4—47Ω
R6—1 KΩ
R7—10 KΩ
R8—150 KΩ
C1—50 mfd.
HR1—15 w. 115 v.
HR2—10 w. 15 v.
Q1—2N1377
Q2—2N1502
D1 and D2—1N1692
D3—1N34
TH1—set to operate 37.0±0.1° C.
TH2—set to open at 34.5±1.0° C.
TF—with 115 v. applied across the primary at 50 to 60 c.p.s., designed to supply 600 ma. D.C. current at 14 v. D.C. in full wave at two secondary end taps after filtration by D1 and D2. The two center secondary taps were adapted to supply 6 v. A.C. at 10 ma.

This two stage heating circuit of the invention brought the thermostatically controlled warming block, formed from aluminum, to a temperature of 37° C. within 5 minutes. This temperature was then maintained within ¼° C. as long as the instrument remained in use.

Thus, the aforenoted objects and advantages are most effectively attained, although a cycle preferred embodiment has been described and illustrated herein, it should be understood, that my invention is in no sense limited thereby, but its scope is to be determined by that of the appended claims.

I claim:

1. A system for regulating the temperature of a given body comprising: first means including a first rapid heating element and a first coarse temperature-responsive switch for principally heating up said body rapidly to a predetermined temperature value short of a predetermined temperature, said switch being constructed and arranged to substantially de-energize said first heating element when said predetermined value is attained, and second means including an auxiliary heating element and a fine temperature-responsive switch which operate to provide auxiliary heat for said body to accurately maintain and to continuously correct minor variations of the temperature of said body from said predetermined temperature.

2. The system according to claim 1 with the addition of means coupled to said first element to provide a continuous indication that said body is at said predetermined temperature.

3. The system according to claim 1 wherein said first heating element is a resistance heater, wherein said first switch is in parallel with resistive means, wherein said parallel circuit is in series with said first heating element, and wherein said first switch opens when said predetermined value is attained thereby diverting current previously traversing it through said resistive means.

4. The system according to claim 3 wherein said resistive means includes means for providing, in response to said diverted current, a continuous visible indication that said body is substantially at said predetermined temperature.

5. The system according to claim 1 wherein said first means is coupled to an alternating current source and wherein said second means also includes a selected number of solid-state switching devices coupled to a direct current source, said solid-state switching devices being constructed and arranged to prevent said direct current from traversing said second heating element when the temperature of said body causes said second switch to close.

6. A system for regulating the temperature of a given body comprising: first means for principally heating up said body to a predetermined temperature, said first means comprising a first resistance heating element in series with a parallel circuit which includes a first thermostat in parallel with a current-limiting resistance in series with an indicating lamp, said first principal heating means being coupled to an alternating current source; and second means for providing auxiliary heat for said body, said second means including a second heating element, a second thermostat, a selected number of transistors, and a source of direct current, said second thermostat, said transistors, and said second heating element being connected in circuit with said direct current source, said second thermostat being constructed to respond to minor increases in the temperature of said body above said predetermined temperature by disabling said transistors which thereupon prevent current from said direct current source from traversing said second heating element.

7. The system according to claim 6 wherein said direct current source includes a transformer secondary winding to the ends of which first and second rectifying elements are respectively coupled, said second heating element being coupled at one end to said first and second rectifying elements; wherein there are two transistors coupled to the other end of said second heating element and to one terminal of said second thermostat, said transistors also being coupled to one another, and wherein said direct current source also includes a third rectifying device coupled to said secondary winding, to the other terminal of said second thermostat and to said transistors.

8. A system for regulating the temperature of a given body comprising a transformer adapted to be connected to an alternating current source, a first circuit for principally heating up said body to a predetermined temperature, said first circuit being connected to a source of alternating current and comprising a first heating element in series with a parallel circuit, said parallel circuit having one branch which includes a first thermostat and a second branch which includes a current-limiting resistance element in series with a neon light; a second circuit for maintaining the temperature of said body within predetermined bounds once said predetermined temperature has been attained, said second circuit comprising the secondary winding of said transformer having first and second ends, first and second rectifiers connected respectively at said first and second ends and having a common junction, a second heating element connected to said common junction, a first transistor connected to said second heating element and to a selected point on said secondary winding, a second transistor directly coupled to said first transistor, a third rectifier coupled to a point on said secondary winding between the ends thereof and to the direct connection between said first and second transistors, and a second thermostat having one terminal coupled to said third rectifier and to the direct connection of said first and second transistors, the second terminal of said thermostat being coupled to said second transistor and to the common junction of said first and second rectifiers.

9. The system according to claim 8 with the addition of capacitive means coupling said third rectifier to said point on said secondary winding.

10. The system according to claim 8 wherein said first thermostat is normally closed, said second thermostat is normally open, said first and second rectifiers are constructed and arranged to supply a negative potential to said second transistor to render it conductive, and said third rectifier is constructed and arranged to provide, via the second thermostat when it is closed, a positive potential to said second transistor to render it non-conductive whereupon said first transistor is also cut off and no current flows through said second heating element.

11. In a system for regulating the temperature of a heating block for liquids in prothrombin and coagulation time determinations, the improvement of: first means including a first rapid heating element and a first coarse temperature-responsive switch for principally heating up said block rapidly to a predetermined temperature value short of a predetermined temperature, said switch being constructed an arranged to substantially de-energize said first heating element when said predetermined value is attained; and second means including an auxiliary heating element and a fine temperature-responsive switch which operate to provide auxiliary heat for said block to continuously correct minor deviations from said predetermined temperature and accurately maintain said block at substantially said predetermined temperature.

12. The system according to claim 11 wherein said first heating element is a resistance heater, wherein said first switch is in parallel with resistive means, wherein said parallel circuit is in series with said first heating element, and wherein said first switch opens when said predetermined value is attained thereby diverting current previously traversing it through said resistive means.

13. The system according to claim 11 wherein said first means is coupled to an alternating current source and wherein said second means also includes a selected number of solid-state switching devices coupled to a direct current source, said solid-state switching devices being constructed and arranged to prevent said direct current from traversing said second heating element when the temperature of said body causes said second switch to close.

References Cited in the file of this patent

UNITED STATES PATENTS

| | | |
|---|---|---|
| 1,183,925 | Waters | May 23, 1916 |
| 2,048,929 | Garman et al. | July 28, 1936 |
| 2,194,820 | Connell et al. | Mar. 26, 1940 |
| 2,285,776 | Maccoy | June 9, 1942 |
| 2,448,776 | Crise | Sept. 7, 1948 |
| 3,028,473 | Dyer et al. | Apr. 3, 1962 |
| 3,068,338 | Bigler | Dec. 11, 1962 |